Apr. 3, 1923. 1,450,681
C. HOLLY
METHOD OF MAKING BOXES AND ELEMENTS THEREOF
Original Filed Sept. 17, 1912 4 sheets-sheet 3

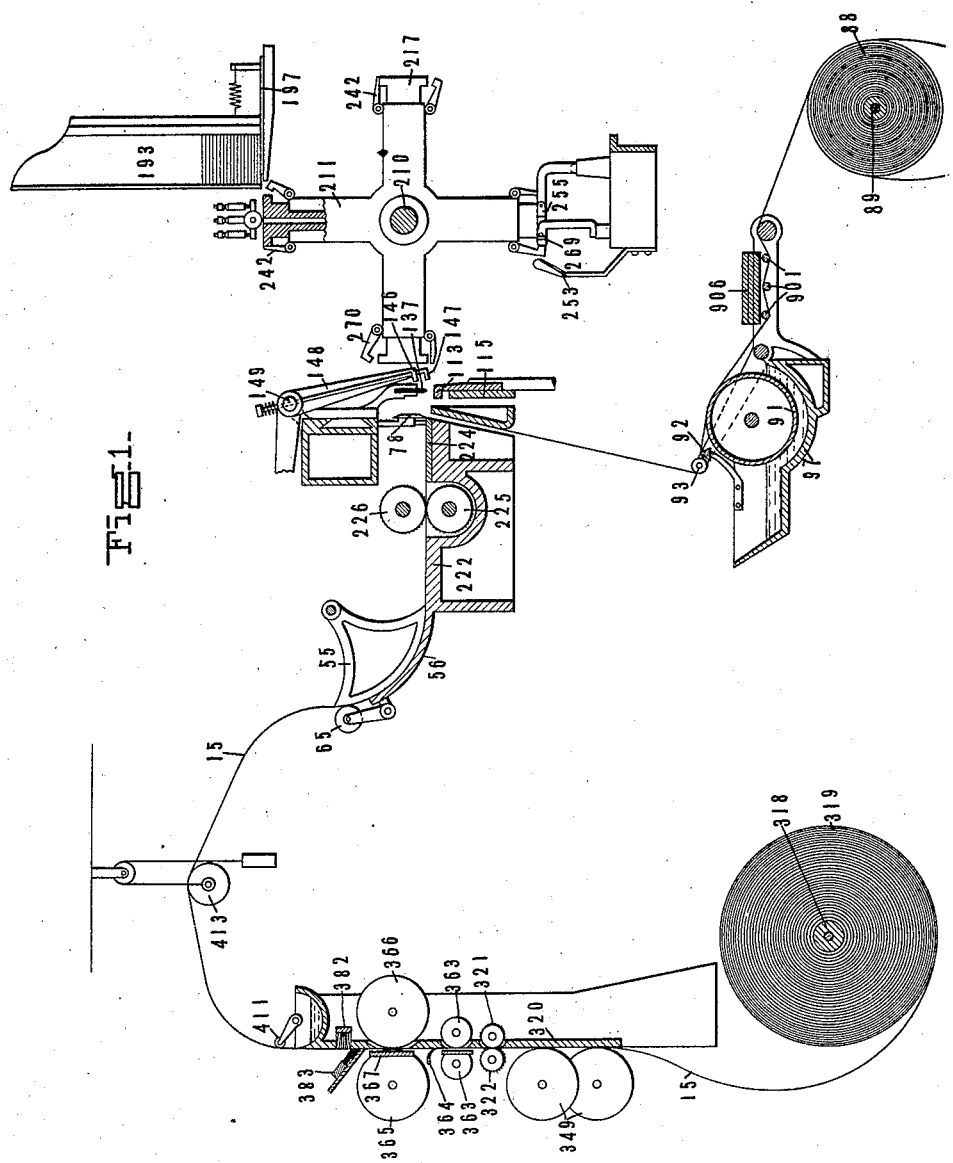

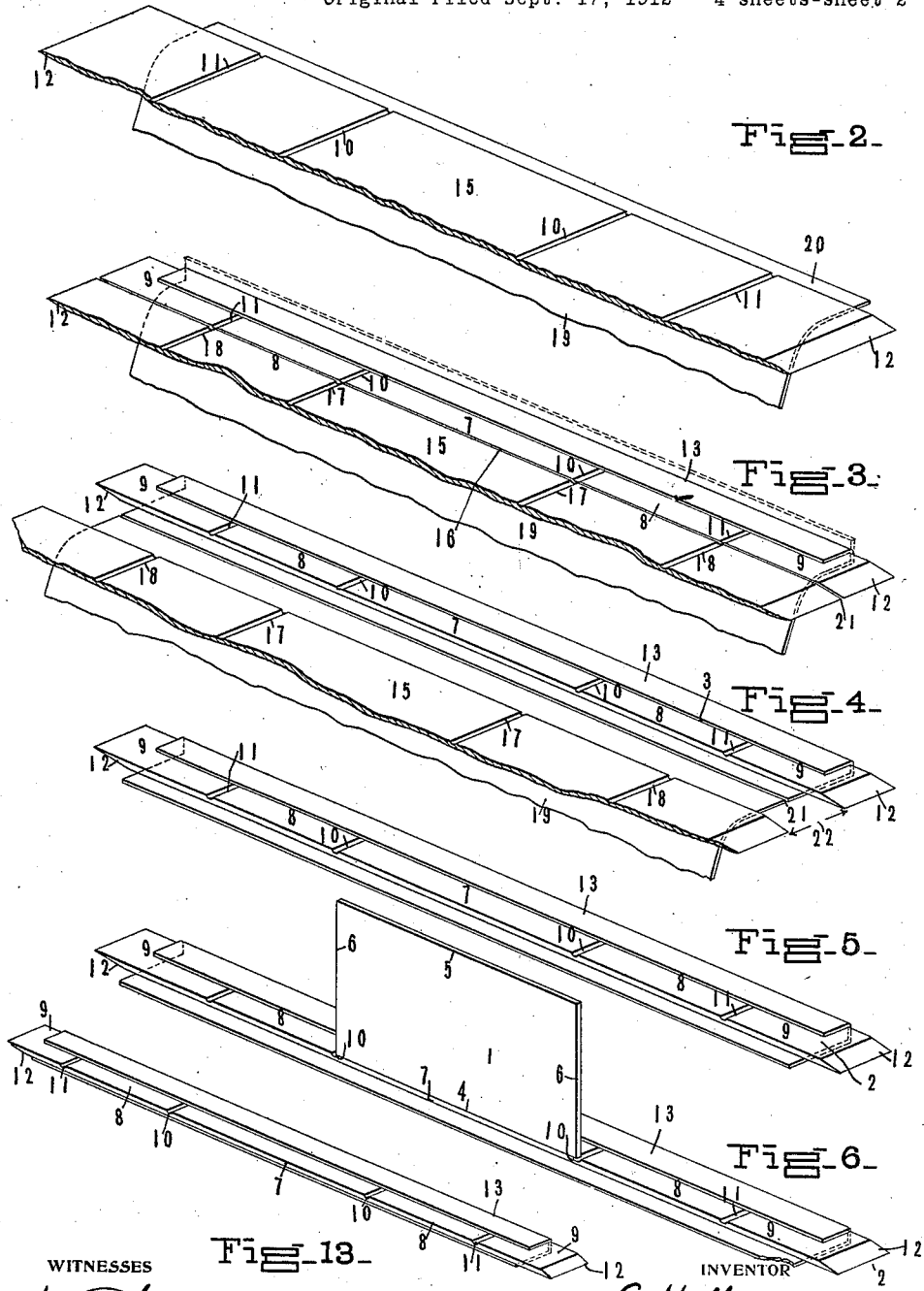

WITNESSES
INVENTOR
C. Holly
BY
ATTORNEYS

Apr. 3, 1923.
C. HOLLY
1,450,681
METHOD OF MAKING BOXES AND ELEMENTS THEREOF
Original Filed Sept. 17, 1912    4 sheets-sheet 4
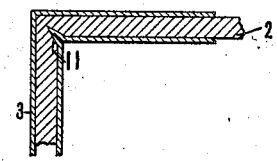
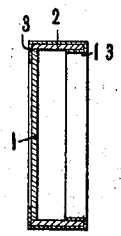
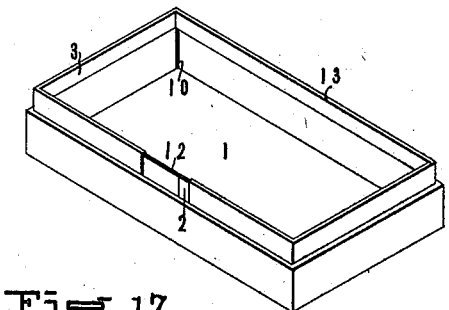
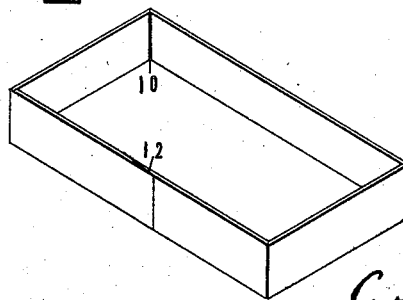
INVENTOR
C. Holly
ATTORNEYS Patented Apr. 3, 1923.

1,450,681

UNITED STATES PATENT OFFICE.

CARLOS HOLLY, OF LOCKPORT, NEW YORK, ASSIGNOR TO F. N. BURT COMPANY, LIMITED, OF BUFFALO, NEW YORK, A CORPORATION OF ONTARIO, CANADA.

METHOD OF MAKING BOXES AND ELEMENTS THEREOF.

Application filed September 17, 1912, Serial No. 720,731. Renewed September 8, 1922. Serial No. 586,973.

*To all whom it may concern:*

Be it known that I, CARLOS HOLLY, a citizen of the United States, residing at Lockport, in the county of Niagara and State of New York, have invented certain new and useful Improvements in Methods of Making Boxes and Elements Thereof, of which the following is a full, clear, and exact description, such as will enable others skilled in the art to which it appertains to make and use the same.

This invention relates to a method of making boxes and parts of boxes of paper or similar material, and with respect to its more specific features to a method of the character referred to wherein the boxes or elements thereof are composed of superposed strips of paper or similar flexible material.

One of the objects of this invention is the provision of a practical method of making flanges, collars, or elements, of boxes with little or no waste of material.

Another object is the provision of an efficient method for rapidly and successively making articles of the character referred to which shall be of a relatively perfect or finished character.

Other objects will be in part obvious and in part pointed out hereinafter.

The invention accordingly consists in the several steps and the relation and order of one or more of such steps with relation to each of the others thereof, which will be exemplified in the hereinafter disclosed method, and the scope of the application of which will be indicated in the claims that follow.

In the accompanying drawing, wherein is shown one of various possible embodiments of the invention, Figure 1 represents diagrammatically a machine or apparatus adapted to carry out the method.

Fig. 2 represents a perspective view of the body web and the cover web in assembled position.

Fig. 3 represents a perspective view of the body web and cover web after the front edge of the cover web has been folded around the front edge of the body web and adhesively secured thereto and after the body web has been severed.

Fig. 4 is a perspective view showing the severed sections spaced from the front end of the body web, said space being bridged by the cover web and showing the cover web severed within said space.

Fig. 5 shows an assembled section ready to be folded into a box element, flange, or collar.

Fig. 6 shows a box head in position on the element shown in Fig. 5, and in this Figure the element represents a flange in position to be folded around the box head.

Fig. 13 is a perspective view, on a smaller scale, showing the cover section cut off flush with the rear edge of the body section.

Fig. 14 is a section through the flange or collar in a plane parallel with the head.

Fig. 15 is a transverse section through the box.

Fig. 16 is a perspective view showing a section similar to that of Fig. 13, folded and inserted in a previously prepared box to serve as a collar therefor, and Fig. 17 is a perspective view showing a box element made by folding an uncovered section of the flange web.

Figure 7:
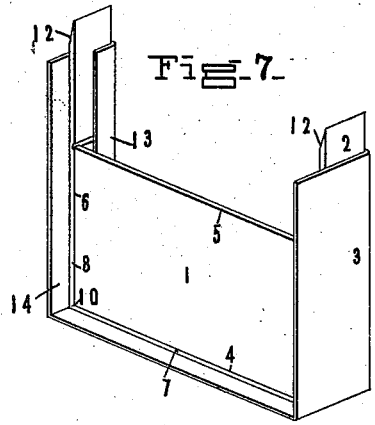
Fig. 7 represents the flange partially folded around the head.

The box which is produced by the improved method comprises a flat head or body 1 and a marginal flange comprising a body portion 2 extending around the edge of the head, and a cover or binder portion 3 connecting the head and body portion. These parts are preferably made of paper of suitable thickness as is usual in articles of this kind, but if desired other materials may be used for this purpose.

The head is preferably rectangular, having a front edge 4, a rear edge 5 and two side edges 6, 6. The flange comprises a strip having preferably a central section 7, two intermediate sections 8, 8 arranged on opposite sides of its central section, and two end sections 9, 9 arranged at the extremities of the flange. On its inner face or side the flange is provided with transverse front scores or grooves 10, 10 between the central section and the intermediate sections, and with transverse rear scores or grooves 11, 11 between the intermediate sections, and the end sections, respectively, and the ends of the flange are preferably scarfed, as shown at 12, 12, the scarf at one end being preferably on the side opposite to that on the end of the other. The head of the box engages with its front edge against the central flange section, its side edges with the intermediate flange sections and its rear edge with the end flange sections, thereby forming the front, side and rear walls of the box. The length of the central, intermediate and combined end sections of the flange are the same as the length of the front, sides and rear edges of the head so that when these parts are assembled the front corners of the head are in line with or adjacent to the front scorings 10, 10 and the rear corners thereof are in line with or adjacent to the rear scorings 11, 11 of the flange and, as will be seen, the corners of the head enter the grooves at the corners of the flanges. The scarfed portions of the end sections of the flange overlap one another and are united by paste, cement, glue or other kind of adhesive which will answer the purpose.

Figure 10:
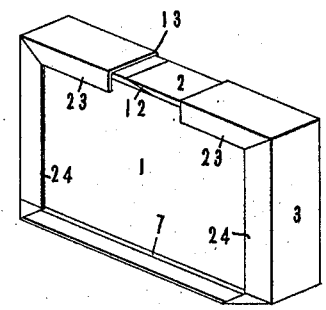
Figure 11:
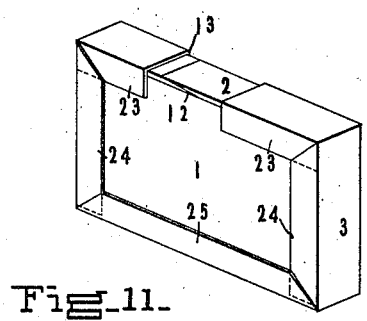
Figure 12:
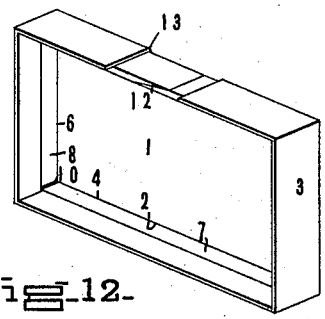
Fig. 12 is a view looking at the interior of the completed box shown in Fig. 11.

The binder consists of a strip which is applied lengthwise to the outer sides of the body strip and turned at its forward edge inwardly over the forward edge of the body strip and against the inner side of the same, as indicated at 13 while its lower edge 14 is turned inwardly against the outer or underside of the head, the binder being secured in this position to the body strip and head by an adhesive of any suitable kind, such as glue, paste or cement. If desired, the binder strip may be of the same length as the body strip, but for certain kinds of boxes this is not necessary, in which case the binder strip is of less length than the body strip and terminates short of both ends of the same, so as to leave the scarf joint between the ends of the body strip on the central part of the rear wall, uncovered by the binder, as shown in Figs. 8-12. In its completed form the scorings or grooves of the body strip are arranged on the inner sides of its corners and the sides of each groove or score are folded toward each other in bending the sections of the body strip to form a corner, thereby causing the outer side of the corner to be sharp and square. In bending the sections of the body to form the corners those portions of the folded upper edge of the binder on the inner side of the body opposite the corners are deflected into the grooves or scores when bending the body and binder around the head, thereby forming square, sharp or finished corners on the inner sides of the box, as shown in Figs. 12 and 14. It will be noted that the binder is smoothly positioned on the inside of the body at the corners, there being little, if any, bunching of the binder at the corners, the grooves at the corners serving to provide space for the reception of the corners of the binder. In this manner neat square corners are formed on the inside and outside of the box, and a more finished appearance is given to the box, as well as greater space for the contents.

The method of making the elements of the box and assembling the elements into complete box form will now be described. The numeral 15 indicates a continuous body web, one of such length that it may be divided into a plurality of blanks or sections transversely, each section being adapted to serve as a box element or a portion thereof as will appear. This web is preferably of paper of such thickness that grooves or recesses may be made in one face by removal of the material of the web. The web 15 is supplied or fed from a suitable roll of material and should be of such width that when divided into sections transversely of its length, each section will be of a transverse dimension corresponding to the extent or peripheral dimension of the corresponding portion of the box element into which it may be subsequently folded. In the present instance the element to be formed is a rectangular tubular element, and the width of the body web corresponds substantially to the peripheral dimension of such tubular element. The forward or front end of the web 15 is transversely severed as at 16, at a distance from its end corresponding to a dimension of the element to be formed in this instance the depth of the flange or collar, and successive operations or severings will result in dividing the web on lines transverse to its longitudinal extent into similar sections. Subsequently each section is bent or folded in a plane transverse to, and preferably, at right angles to the longitudinal extent of the web into a box element, and on lines transverse to the severed edge, these lines corresponding to the longitudinal lines of the web, and being continuations thereof, and the opposite ends of the sections are preferably connected so as to maintain the folded condition, resulting in a continuous or tubular box element such as shown in Fig. 17, in which the axis of the tube is generally normal or perpendicular to the plane of folding, which may be denominated a box flange or a box collar, or a neck, dependent upon the use to which it may be put. In the present embodiment the opposite ends of the sections are scarfed or beveled as at 12, and the scarfed surfaces abutted with the interposition of adhesive, such as glue, etc., although any manner of maintaining the folded condition of the sections may be used. The direction of feed of the body web is in the general direction of the longitudinal extent of the web, and it will be observed that the web is divided into sections on lines transverse to the direction of feed, and that when the sections are folded, as previously described, the lines of folding or bending follow the general direction of, or are coincident with, the length of the web, the folding taking place in a plane substantially parallel to that dimension of the section which corresponds to the width of the web, the lines of fold in the section thereby corresponding to lines of the web which extend transversely of the width of the webs. By proceeding in the manner described, the peripheral dimension of the box element to be formed is taken from the width of the web, and as in many boxes the peripheral extent is greater than the dimension at right angles thereto, the method herein described enables a greater number of elements to be obtained from the same length of web, besides avoiding transfer of the sections into different planes before subsequent folding, which latter takes time, and requires mechanism to accomplish the transfer, when performing the method by mechanical means.

As previously described, the sections of the body web are folded on lines coincident with the length of the web, which lines are continuations of similarly located lines of the web, and in making angular or rectangular elements, as in the box before described, the folding lines are spaced from each other in a manner corresponding to the spacing of the corners of the box. The web 15 is provided with continuous longitudinally disposed recesses or grooves 17, 17, 18, 18, on lines which are to become the folding lines of the sections, and preferably the grooves are made by removing or abrading the material of the web to a sufficient depth, as the web is fed, and the walls of each groove are angularly arranged, being oppositely inclined from the face of the web towards the center of the groove, so that when the sections are folded at the grooved portions, the walls of the respective grooves approach each other, and a square corner results on the outside of the folded element. It will be obvious also that the inclination of the walls of the grooves may be such that when the fold is completed the opposite walls of the grooves may be in contact with each other, but it is preferred to leave some space therebetween for a purpose which will hereinafter appear.

The method so far described also lends itself readily to the production of boxes or elements thereof composed of a plurality of superposed strips, blanks, or sections of webs, such as a collar or flange comprising a body strip and a superposed strip, which latter may completely or only partially cover the body strip, and may also be utilized to bind or secure the flange to the box head. In the present embodiment one of the opposed strips is employed not only to cover the other strip, but to bind or secure the flange and head of the box together.

The numeral 19 indicates a continuous web of flexible paper, preferably glazed on one side, or face, and adapted to serve as the cover or binder, above referred to. This cover web is of such length that it may be divided into a plurality of sections transversely, each section being adapted to be connected to a section of the body web. The width of the cover web 19, approximates that of the body web, as shown, sufficient uncovered space on the body web being left, in the present instance, to permit the beveled ends of the body sections to be joined. The cover web is supplied from a suitable roll and is fed and guided so that its free or forward end is positioned relatively to the forward end of the body web so that the ends of the webs may be attached, preferably by folding the forward end of the cover web over that of the body web. To this end, the cover web is coated on one side with glue or other adhesive and engaged near its front end with the front part of the under or unscored side of the body web and in a position parallel therewith and with the front end 20 of the cover web projecting forwardly beyond, thus overlapping the front end of the body web, as shown in Fig. 2, with the glued side of the cover web facing the body web, the front ends of the webs being thus superposed and in parallel relation.

After the cover web has been thus assembled with and pasted to the outer or under side of the body web, the projecting front end of the cover web is folded or turned upwardly, backwardly and downwardly over, or around the adjacent end of the body web, with its glue coated surface against the inner side of the body web, whereby the interfolded parts are adhesively secured together in this condition of the cover web, as shown in Fig. 3.

After a body section has been cut, as at 21, transversely from the front end of the cover web as before described, the same is advanced together with the cover web attached thereto so as to form an intervening space or gap 22 between the rear edge of the severed body section and the front edge of the body web, which space or gap is bridged by that part of the binder, or cover web trailing behind the advancing body section as shown in Fig. 4. In the case of a plurality of webs the cut 21 is made in the body web at a point without those portions of the webs which are adhesively attached, the binder web bending away from the body web so as not to be cut by the body cutter. During this forward movement of the body section and the cover web the body web is also moved, or fed, forwardly but less than the body section and cover web, so that the cover web remains with its glued surface in contact with the under or outer side of the front edge portion of the body web, whereby the cover web is dragged with its glue coated surface past this portion of the body web and this glue coated surface, which is on the upper or inner side of the cover web, is exposed between the severed body section and the front end of the body web. After the body section and the body web have been thus separated, that part of the cover web which bridges the space or gap between the body section and body web is severed transversely at a desired point dependent upon the character of the box element to be formed. If a box having a head is to be made, the cover web is severed about midway between the body section and the body web as shown at 21 in Fig. 4, and a strip shaped binder is completed which projects with its rear edge beyond the rear edge of its companion body section, or strip, overlapping the rear edge of the body section. The portion of the cover web in rear of the severing line projects forwardly beyond the front end or edge of the body web, leaving these parts associated in a position corresponding to that indicated in Fig. 2, ready for turning the front end of the cover web over the front edge of the body web, preparatory to severing the next following sections from the respective webs.

In case it should not be desired to utilize an extension of the cover as a means to secure the head to the flange, the cover web may be severed on a line flush with the rear edge of the body section as shown in Fig. 13, and when this collar is folded and its opposite ends connected, as previously described, it may serve as a flange for a box, being connected to the head in any other efficient manner, or it may be assembled with a previously made box and serve as a collar therefor, as shown in Fig. 16.

Figure 8:
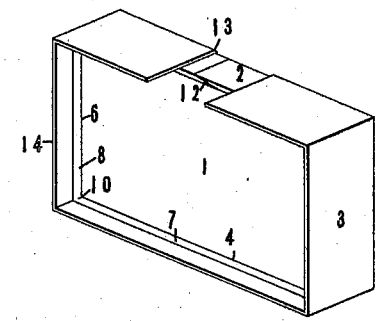
Fig. 8 represents the flange completely folded around the head with the scarfed edges superposed.
Figure 9:
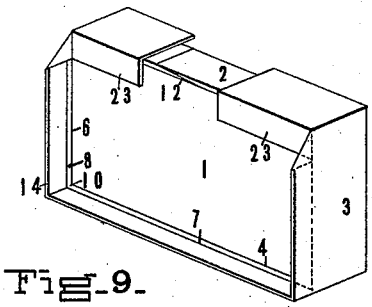
Figs. 9, 10 and 11 represent the successive steps of folding the binder against the outside face of the head.

After the flanges, or covered sections, have been severed from the webs, they are to be assembled with heads to complete the boxes. The heads 1 are preferably rectangular in shape, and are supplied from a suitable source such as a magazine. The heads are delivered successively from the magazine and, while in a vertical position, each is placed with its front or lower edge against the inner side of the central section of the flange adjacent to its lower edge, as shown in Fig. 6. Then the intermediate sections of the superposed strips are simultaneously folded inwardly on the scored lines against the opposite side edges of the head, as shown in Fig. 7. Next the end sections of said strips are folded inwardly against the rear edge of the head and at the same time the scarfed parts of the body strip which have been previously coated with glue are lapped one over the other, so as to unite these end sections, as shown in Fig. 8. The rear end portions 23 of the glue coated lower edge of the binder strip are now folded inwardly and pasted against the under or outer side of the head, as shown in Fig. 9, then the side portions 24, 24 of this edge of the binder strip are in like manner turned inwardly and pasted against the under or outer side of the head, as shown in Fig. 10, and finally the front part 25 of this edge of the binder strip is also turned inwardly and pasted against the under side of the head, as shown in Fig. 11, thereby completing the box.

In thus folding the flange around the edges of the head, the opposite sides, or walls, of each of the scorings are brought towards each other and those portions of the inwardly turned upper edge portions of the cover or binder opposite the scorings are folded into the latter, as shown in Fig. 14, thereby forming sharp or square corners on the box, both on the outer and inner sides of the same, instead of round corners, as might be the case if these inner scorings were omitted.

In bending or folding the section, or composite strip, or blank, composed of a pair of web sections, at the scored lines, a sharp angle results on the outer or convex portion of the folded element, and the cover material on the inside of the strip facing the scores spans the scores at the folded portions. In the embodiment illustrated sufficient space is left between the walls of each score at the corner to receive a portion of the cover material, and the corners of the head. As will hereinafter appear, the folding of the sections, or strips, is simultaneously accomplished around a rectangular mandrel, and the corners of the mandrel assist in the smooth disposition of the folds of the cover, preferably deflecting portions thereof into the scores or grooves. The cover strip being provided with adhesive, as before explained, the folded portion of the strip will be adhesively secured to the walls of the grooves when seated therein.

By the before described operations not only is the assembly of the webs, the scoring of the sections, the folding of the sections and their assembly with heads most efficiently accomplished, but the time of the operations and the disposition of the webs, enables the webs to be more readily prepared for their subsequent severing, folding, etc.

Any efficient mechanism may be employed to automatically carry out the method herein described, but it is preferred to employ the machine disclosed in applicant's prior application filed April 24, 1909, Serial No.

492,029, of which this application is largely a continuation.

In Fig. 1 of the drawings is a diagrammatic illustration of the machine disclosed in the aforesaid application, and reference is made to said application for a complete disclosure of the details of the machine, which in this manner is made a part of the disclosure of this application. The flange, or body web 15 is supplied from a roll of web 319 supported on a loosely turning shaft 318. From the roll 319 the body web passes over a vertically disposed plate 320 adjacent one face of which are disposed a plurality of abrading wheels 349, which remove the material of the web providing the parallel scores 10 and 11. 321 and 322 represent continuously operating knurled feed rollers co-operating through an opening in the table, and adapted to feed the web from the roll 319. Properly disposed adjacent each edge of the web are continuously operating scarfing wheels 365 and 366, the wheel 365 being disposed opposite that face of the table 320 over which the web passes, and the wheel 366 cooperating through an opening in said table with the opposite face of the web, a plate 367 serving to support the web opposite the wheel 366. These wheels bevel or scarf the opposite edges of the web as indicated at 12, preferably on opposite faces of the web. 382 and 383 indicate movable, preferably reciprocatory brushes or clearers disposed on opposite sides of the body web and adapted to brush the scored and scarfed portions thereof and remove particles of web from the abraded portions, so that the web will arrive at the gluer and subsequent mechanisms in a smooth and clean condition. The numeral 411 indicates a gluing or adhesive applying wheel which is adapted to apply glue from a suitable reservoir to one scarfed lateral edge of the web, as the web is fed past the same. From the gluer 411 the body web passes above a large roller 413, which is yieldingly upheld by weighted cords, so as to provide for feed of this web from the scoring wheels intermittently, and is guided to the horizontal table 222, passing between oscillatory curved blades 55, which engage the scores of the web, and a curved guide, or plate 56, a blade being provided for each score. Rollers 65 are disposed one opposite each score to maintain the blades in the scores, the rollers 65 being yieldingly pressed against the web. 225 and 226 indicate knurled feed rollers adapted to yieldingly grip the body web intermediate its edges. These rollers are operated to intermittently feed the body web to assembly position and to the cutting mechanism. The body web is trimmed at its opposite edges to the exact width required by rotary cutters 363, properly journaled adjacent each edge, the surplus edge being deflected from the machine in any suitable manner as by curved guide plates 364.

The cover or binder web is supplied from a roll 88 on a loosely mounted spool 89, and passes through a tension device comprising parallel bars 901, a weight 906 resting on the web. The cover web is guided by a roller 93, into contact with a glue supply roller 91 which takes glue from a supply pot 97 and applies it to one face of the web. 92 is a scraper to remove surplus glue from this web. From the guide roller 93, the cover web passes to the front of the table 222, at a point near the end of the body web, in such manner that its glued face will contact the bottom face of the body web when the webs are superposed.

78 indicates a cutting disc which reciprocates across the body web and co-operates with the front edge of a plate 224 to sever a strip or section from the end of the body web. 113 indicates a combined folding and pressing bar which is made to move upwardly to fold the projecting end of the cover web against the front edge of the body web, then rearwardly to fold the cover web onto the body web, and serve as an abutment for a presser bar or block 115 which moves upwardly to press the interfolded parts between itself and the bar 113. Suitable provision is made for giving proper motions to the folding bar and the presser bar.

Before the bar 113 performs its folding and pressing operation, it is moved to a position to support the unfolded cover web, and its upper surface serves as a cutter platen to co-operate with a second cutting disc 137, which is reciprocated across the cover web to sever sections therefrom.

A rock shaft 149 is provided with arms 148 terminating in gripper jaws 146 and co-operative gripper jaws 147 movable towards and from the jaws 146, at proper times.

The carrier comprising these jaws is moved towards the interfolded cover web and body strip and caused to grip the same, reverse movement of the carrier serving to transfer the interfolded parts towards a flange folding or collar folding mechanism, and thus, at the same time, to intermittently feed the cover web. When the cover web has been thus fed, the cutter 137 passes across the cover web and in co-operation with the bar 113 severs the cover web, as before explained.

As the flange web passes along the table 222, glue of relatively thick consistency is deposited upon the unglued scarfed lateral edge of the flange web by any suitable mechanism. The disposition of the gluers permits the glue on one scarf to become dry, or nearly so, whereby it assumes a "tacky" condition, before the joint of overlapping scarfs is formed, the gluing of the opposite scarf as it passes over the table 222, and therefore more nearly adjacent the flange folding mechanism, providing sufficient moisture for the joint.

Upon being carried forward by the transferring mechanism comprising the jaws 146, 147, the flange and binder are assembled with a box head which is preferably of rectangular form. These heads are supplied from a stack contained in an upright magazine 193, and a reciprocatory plunger 197 feeds the heads successively from the bottom of the stack. As the box heads are discharged from the stack they are pressed against the end face of a rectangular former or mandrel 217, being preferably pneumatically held in position thereon. A plurality of formers 217 is employed, one being provided at the end of each of four radiating arms 211 of an intermittently rotating hub 210. Each former is provided with a front jaw 242, which at the proper time is operated to clamp the central parts of the adhesively attached body section and cover section against the front side of the former, and to release the same. A head having been fed from the magazine to the former, and pneumatically held thereon, the former is advanced one step and is carried to a position in front of the body and cover assembling mechanism, where it remains momentarily at rest. As the former reaches this last-mentioned position, the box head carried thereby is engaged at its lower or front longitudinal edge with the inner side of the central section of the box flange adjacent to its rear or lower edge, which latter together with its companion binder is at the same time moved forwardly by the transferring grippers in position to be thus engaged by the respective box head (see Fig. 6). After this engagement the jaw 242 is operated to clamp the central section of the body and cover against the former, and this clamping continues until the folding of the body and cover and assembly with the head is completed, whereupon the jaw 242 is moved to release the elements and permit the box to be removed or ejected from the former.

As the former moves from the body and cover assembling position and approaches the lowermost position of the form-carrier, a preliminary folding or bending of opposite ends of the body and cover against opposite ends of the former is effected by a pair of folding horns 253 arranged respectively on opposite sides of the path of the end portions of the body and cover in advance of the position where the former comes to rest for completing the folding of the body and cover. After the former comes to rest in its lower horizontal position, the folding of the intermediate sections of the elements against opposite lateral sides of the former and the adjacent edges of the box head is completed so that these portions or sections of the body and cover are parallel and at right angles to the central or front body section and engage on their inner sides adjacent to their inner edges with the respective lateral edges of the box-head on the former. The mechanism whereby this is accomplished comprises two side pressing or clamping jaws 255 (only one of which is shown) which are laterally movable towards and from opposite sides of the former 217 when the latter is in position between the same. Then the end sections of the body section and the adjacent parts of the cover or binder are turned inwardly or toward each other and against the back of the former and the rear edge of the box head so that, preferably, these rear sections overlap each other with their scarfed portions and are arranged parallel to the front walls of the box. This operation of folding or bending the rear sections of the body and cover is effected by means of two rear folding and pressing jaws 269.

After the scarfed portions of the flange strip have been overlapped and pressed together as aforesaid, the jaws 269 open so as to be in position to perform a similar operation upon a succeeding flange and binder, but it is preferred to preserve a pressure on the joint for a further period or until the glue sets sufficiently. To this end 270 is a rear clamping jaw adapted to move toward and from the rear side of that portion of the former opposite the joint in the flange, and when the jaws 269 have folded the flange, the jaw 270 is moved to press the joint and continues the pressure during subsequent folding operations, the pressure being relieved in time to permit the box to be ejected from the former.

Further descriptions herein of the folding mechanism is unnecessary for the purpose of this disclosure, it being understood that the above description of mechanism for carrying out the method is merely an embodiment in this application of so much of the prior application as may be desirable in order to facilitate the explanation of the method. It will be understood that the elements of the machine are suitably connected for automatic operation, and that the operations hereinbefore referred to will be so timed as to occur in such sequence as required by the method disclosed.

It will be noted that by the method disclosed a body web having a width of the length of the flange desired is provided, and that the binder web also approximates in width that of the body web. The width of the cover web may be greater than that of the body web, should it be desired to cover the scarfed joint, or to abut the ends of the body section and join them by the cover. Viewed in some aspects, the scarfs may be omitted and any suitable joint provided.

By taking the sections from the width of the webs, and folding the sections at the scored portions, it will be seen that the sections are in effect folded on lines which are parallel to the length of the webs and to their general direction of feed when the sections are regarded as parts of the web; the folding lines of the sections being in effect continuations of similar lines of the webs. In this manner practically the entire length of the webs may be utilized, and a greater number of flanges or binders provided from the same length of web. As the length of the flange or the binder or cover is taken up by the width of the webs, the extent of feed of either of the webs need approximate only the width of the flange as distinguished from its length. It will be observed that the glue is applied to the scarfed edge by the gluer 411 an appreciable time before the joint is formed so that it has time to become "tacky" or even dry before the formation of the joint. It is also to be noted that the scoring wheels, or emery wheels, are designed to rapidly rotate so as to remove the material of the web, requiring no such pressure as might produce a bead on the web opposite its scored face. Furthermore, it will be noted that all the operations from the feeding of the webs to the completion of the collars or boxes may be practically continuously performed, so that once the machine is set in operation the work is automatic from beginning to end. By providing a yielding portion of body web between the scoring wheels, which are continuously operated, and the body web cutter, which latter operates intermittently, either of said operations may be performed irrespective of the other, the slower continuous movement of the web past the grinding or scoring wheels being compensated by the more rapid rate of feed due to the intermittent feed rollers 225 and 226.

While the method is herein described in connection with a flange and binder for a box, the names of the box elements have been chosen merely as a convenient means of explanation. It is obvious that the broad method is not changed by severing the binder web flush with the rear edge of the flange strip, as illustrated in Fig. 13, so that no trailing portion of binder results. The article thus produced would serve as a box flange when properly attached to a box, or might serve as a collar or neck of a box when properly associated therewith, as illustrated in Fig. 16.

Thus by the above description is disclosed a method of efficiently accomplishing, among others, the objects hereinbefore stated.

As many changes could be made in carrying out the above method without departing from the scope of the invention, it is intended that all matter contained in the above description shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. The method of making box elements which comprises feeding a web, scarfing the edges thereof on opposite faces, applying an adhesive to the scarfed edges thereof as it is fed, dividing the web into sections, folding the sections on lines transverse of the severed edge, and superposing the adhesive supplied scarfed edges after the glue on one edge has become tacky.

2. The method of making boxes which comprises feeding a web, abrading the same to provide grooves longitudinally of the web having angularly arranged walls, dividing the web into sections on lines transverse to the longitudinal extent of the grooves, supplying angular heads, folding the sections around the heads causing the walls of the respective grooves to approach each other and receive the corners of the heads, and securing the heads to the sections.

3. The method of making boxes which comprises feeding a web, abrading the same to provide grooves longitudinally of the web having angularly arranged walls, dividing the web transversely of the grooves into sections, supplying angular heads, folding the sections on the grooved lines around the heads causing the corners of the heads to enter the grooves in the sections and securing the heads to the sections.

4. The method of making boxes which comprises feeding a web, abrading the same to provide grooves longitudinally of the web, clearing the web of particles, dividing the web into sections on lines transverse to the longitudinal extent of the grooves, supplying angular heads, folding the sections around the heads causing the corners of the head to enter the grooves, and securing the heads to the sections.

5. The method of making box elements which comprises feeding a plurality of webs into assembly position, folding the end of one web over the end of the other, adhesively securing the interfolded parts, severing the webs transversely of the longitudinal extent thereof on lines spaced from the edge of the interfolded portion, and folding the sections on lines transverse of the interfolded edge.

6. The method of making box elements which comprises feeding a plurality of webs into assembly position with the lateral edges of the assembled portions thereof in parallel planes, folding the advance end of one web over the end of the other, severing said webs in rear of the interfolded edge, and folding the severed sections on lines transverse of the interfolded edge.

7. The method of making box elements comprising feeding a body web and a cover web into superposed relation with the forward end of the cover web projecting beyond the body web, folding the projecting end over the end of the body web, adhesively securing the interfolded parts, severing the webs transversely at points spaced from the forward end of the assembled webs, folding the sections on lines transverse of the severed edge, and connecting the opposite ends of the sections.

8. The method of making box elements comprising feeding a body web and a cover web, superposing the end portions of the body web and the cover web, folding the forward end of the cover web over the adjacent end of the body web, adhesively attaching the interfolded portions, severing the body web transversely, thereafter spacing the severed section from the body web, and then transversely severing the cover web.

9. The method of making box elements comprising feeding a body web and a cover web, superposing the end portions of the body web and the cover web, folding the end of the cover web over the end of the body web, adhesively attaching the interfolded portions, severing the body web transversely, moving the assembled portions thereby feeding the cover web, and transversely severing the cover web.

10. The method of making box elements comprising feeding a body web and a cover web, superposing the end portions of the body web and the cover web, folding the end of the cover web over the end of the body web, adhesively attaching the interfolded portions, severing the body web transversely, thereafter moving the assembled portions thereby feeding the cover web, and then transversely severing the cover web at a point to provide a portion of cover web overlapping the rear edge of the section of the body web.

11. The method of making box elements comprising feeding a body web and a cover web, superposing the end portions of the body web and the cover web, the cover web being coated with adhesive on a side facing the other and extending beyond the other, folding the extended end over the end of the body web, transversely severing the body web while preserving the continuity of the cover web, moving the assembled portions relatively to the body web thereby spacing an edge of the section of the body web from the end of the body web, and then transversely severing the cover web within said space.

12. The method of making box elements comprising superposing the end portions of continuous web supplies, one of said webs being adhesively coated on a side facing the other, folding the end of one web onto the other on a line extending transversely of the length of the web, severing one web while preserving the continuity of the other web, spacing the section from its supply web, and severing the other web at a point spaced from its folding line.

13. The method of making boxes comprising feeding a plurality of webs into assembly position, folding the forward end of one web over the adjacent end of the other, adhesively securing the interfolded parts, severing the webs transversely, supplying heads, folding the severed sections into tubular box elements, and securing them to the heads.

14. The method of making boxes comprising feeding a plurality of webs into assembly position, folding the forward end of one web over the adjacent end of the other, adhesively securing the interfolded parts, severing the webs transversely, supplying heads, folding the severed sections around the heads, connecting the opposite ends of the sections, and securing the sections to the heads.

15. The method of making boxes comprising feeding a plurality of webs into assembly position, folding the forward end of one web over the adjacent end of the other, adhesively securing the interfolded parts, transversely severing the webs so as to provide web sections having overlapping ends, supplying heads, folding the sections around the heads, connecting the opposite ends of the sections, and folding the projecting portion of one web section against the face of the head and securing the same thereto.

16. The herein described method of making boxes having a head, and a flange at the edge of the head comprising first adhesively connecting a body web and a binder web, then severing a strip from the body web to form a flange element, then advancing said flange element with the binder web attached thereto transversely of said severing line to form a gap between said flange element and the body web, then severing a strip from the binder web between the flange element and the body web to form a binder, folding the flange element and binder around the head on lines transverse to the severed edges of said sections, and then attaching the flange element and binder to the head.

17. The herein described method of making boxes having a head, and a flange at the edge of the head comprising first adhesively connecting a body web and a binder web, then severing a strip from the body web to form a flange element, then advancing said flange element with the binder attached thereto transversely of said severing line to form a gap between said flange element and the body web, then severing a strip from the binder web between the flange element and the body web to form a binder, folding the flange element and binder around the head on lines of the flange and binder which are continuations of the lines of the web parallel to the direction of feed of said webs, and then attaching the flange element and binder to the head.

18. The herein described method of making boxes having a head, and a flange at the edge of the head, comprising first adhesively connecting a body web and a binder web with the binder web projecting forwardly beyond the body web, then folding the front end of the binder web over the front edge of the body web, then severing a strip from the body web to form a flange element, then advancing the flange element and the binder web attached thereto to form a gap between the flange element and the body web, then severing a strip from the binder web midway between the flange element and body web to form the binder and leave the latter projecting rearwardly beyond the flange element, and the binder web projecting forwardly beyond the body web, then applying a head to the flange element, and then adhesively securing the rear edge of the binder to the outer side of said head.

19. The herein described method of making boxes having a head, and a flange at the edge of the head, comprising first adhesively connecting a body web and a binder web with the binder web projecting forwardly beyond the body web, then folding the front end of the binder web over the front edge of the body web, then severing a strip from the body web to form a flange element, then advacing the flange element and the binder web attached thereto and also advancing the body web but less than the flange element to form a gap between the flange element and body web and cause the front end of the body web to become adhesively connected with the binder web in rear of the severed flange element, then severing a strip from the binder web midway between the flange element and body web to form the binder and leave the latter projecting rearwardly beyond the flange element and the binder web projecting forwardly beyond the body web, then applying a head to the flange element, and then adhesively securing the rear edge of the binder to the outer side of said head.

20. The method of making box elements which comprises feeding a plurality of webs so that the ends thereof are superposed, feeding heads, abrading one web longitudinally to provide grooves having angularly arranged walls, severing said webs transversely, thereby providing sections of one web assembled with those of the other in pairs, separately folding successive pairs of said sections around said heads so that the corners of said heads lie in said grooves, and joining the opposite ends of one section of said superposed sections.

21. The method of making box elements which comprises supplying successive pairs of superposed blanks, one blank of each pair having beveled opposite ends, supplying heads, separately folding successive pairs around successive heads, and superposing and adhesively joining the beveled ends of each of said beveled blanks.

22. The method of making box elements which comprises feeding a plurality of webs so that the ends thereof are in superposed relation, feeding heads, grooving one of said webs longitudinally, beveling the edges of the grooved web, severing said webs at intervals, transversely, thereby providing sections of one web assembled with those of the other in pairs, separately folding successive pairs around successive heads so that the corners of the heads enter the grooves, and superposing and adhesively joining the beveled ends of each of said beveled sections.

23. The method of making a box element which comprises superposing a blank on a portion of a web, simultaneously advancing said blank and web, thereafter severing said web, and then folding the composite blank so formed into a tubular element on lines of the composite blank which correspond to longitudinal lines of said web.

24. The method of making a box element which comprises superposing a blank on a portion of a web, simultaneously advancing said blank and web, thereafter severing said web, and then folding the composite blank so formed into a tubular element on lines of the composite blank which extend transversely of the severed edge of the blank severed from said web.

25. The method of making a box element which comprises feeding a web so that a portion thereof will be opposite and in parallel contiguous relation to a portion of another web, severing one web transversely of its feeding axis, simultaneously advancing the blank so formed and the other web, thereafter severing the other web, and then folding the composite blank so formed on lines thereof which correspond to lines of the webs which extend transversely of the width of the webs, into a tubular element.

26. The method of making a box element which comprises feeding a web so that a portion thereof will be opposite and in parallel contiguous overlapping relation to a portion of another web, folding the overlapping portion around the adjacent edge of the other web, thereafter severing said webs in rear of the edge around which the fold is made, and subsequently folding the composite blank so formed on lines thereof which correspond to lines of the webs which extend transversely of the width of the webs, into a tubular element.

27. The method of making a box element which comprises providing a web the width of which substantially corresponds to the peripheral dimension of a tubular element to be made, severing said web transversely of its longitudinal dimension, thereafter folding the section in a plane thereof which is transverse to the longitudinal dimension of the web before said severing, and disposing a cover around a transverse edge of the section before said folding.

28. The method of making a box element which comprises providing a web the width of which substantially corresponds to the peripheral dimension of a tubular element to be made, feeding said web, severing said web, thereafter folding the section in a plane thereof which is transverse to the direction of feed of the web before said severing, and disposing a cover around a transverse edge of the section before said folding.

29. The method of making a box element which comprises providing a web the width of which substantially corresponds to the peripheral dimension of a tubular element to be made, successively severing said web transversely of its longitudinal dimension, thereafter folding the successive sections in planes thereof, respectively, which are transverse to the longitudinal dimension of the web before said severing, and folding covers around successive transverse edges of said web before the resultant covered sections are folded.

30. The method of making a box element which comprises providing a body web the width of which substantially corresponds to the peripheral dimension of a tubular element to be made and an adhesive coated cover web of a width approximating the width of the body web, moving said webs so that their advance ends are superposed, then severing said body web and folding said cover web so as to provide a body blank adhesively connected to the cover web with a portion of the cover web folded around the adjacent edge of the body blank, and thereafter severing said cover web.

31. The method of making a box element which comprises providing a body web the width of which substantially corresponds to the peripheral dimension of a tubular element to be made and an adhesive coated cover web of a width approximating the width of the body web, moving said webs so that their advance ends are superposed, then severing said body web and folding said cover web so as to provide a body blank adhesively connected to the cover web with a portion of the cover web folded around the adjacent edge of the body blank, thereafter severing said cover web, and then folding the composite blank so formed on lines thereof which correspond to lines of the webs which extend transversely of the width of the webs, into a tubular element.

32. The method of making a box element which comprises providing a body web the width of which substantially corresponds to the peripheral dimension of a tubular element to be made and an adhesive coated cover web of a width approximating the width of the body web, moving said webs so that their advance ends are superposed, then severing said body web and folding said cover web so as to provide a body blank adhesively connected to the cover web with a portion of the advance end of the cover web folded around the advance edge of the body blank, and thereafter severing said cover web.

33. The method of making a box element which comprises providing a body web the width of which substantially corresponds to the peripheral dimension of a tublar element to be made and an adhesive coated cover web of a width approximating the width of the body web, moving said webs so that their advance ends are supposed, then severing said body web and folding said cover web so as to provide a body blank adhesively connected to the cover web with a portion of the advance end of the cover web folded around the advance edge of the body blank, thereafter serving said cover web, and then folding the composite blank so formed on lines transverse to the edge around which the cover blank is disposed.

34. The method of making a box element which comprises providing a body web the width of which substantially corresponds to the peripheral dimension of a tubular element to be made and an adhesive coated cover web of a width approximating the width of the body web, moving said webs so that their advance ends are superposed, then folding the advance end of said cover web around the advance end of said body web and severing the body web, thereafter advancing said body web section with the cover web attached thereto, and then severing said cover web.

35. The method of making a box element which comprises providing a body web the width of which substantially corresponds to the peripheral dimension of a tubular element to be made and an adhesive coated web of a width approximating the width of the body web, moving said webs so that their advance ends are superposed, then folding the advance end of said cover web around the advance end of said body web and severing the body web, thereafter advancing said body web section with the cover web attached thereto, then severing said cover web, and then folding the composite blank so formed on lines thereof which correspond to lines of the webs which extend transversely of the width of the webs, into a tubular element.

36. The method of making a box element which comprises providing a body web the width of which substantially corresponds to the peripheral dimension of a tubular element to be made, said web having beveled lateral adhesive coated edges and an adhesive coated cover web of a width approximating that of the body web, feeding said webs so that their advance ends are superposed, severing said webs transversely of their lines of feed, respectively, and then simultaneously folding the severed blanks on lines thereof which correspond to lines of the webs which extend transversely of the width of the webs and abutting the beveled opposite sides of the body section.

37. The method of making a box element which comprises providing a body web the width of which substantially corresponds to the peripheral dimension of a tubular element to be made, said web having beveled lateral adhesive coated edges and an adhesive coated cover web of a width approximating that of the body web, feeding said webs so that their advance ends are superposed, folding the advance end of the cover web around the advance end of the body web, severing said webs transversely of their lines of feed, respectively, and then simultaneously folding the severed blanks on lines thereof which correspond to lines of the webs which extend transversely of the width of the webs and abutting the beveled opposite sides of the body section.

38. The method of making a box element which comprises providing a body web the width of which substantially corresponds to the peripheral dimension of a tubular element to be made, said web having beveled lateral adhesive coated edges and an adhesive coated cover web of a width approximating that of the body web, feeding said webs so that their advance ends are superposed, folding the advance end of the cover web around the advance end of the body web, severing said webs transversely of their lines of feed at different distances from their advance ends, respectively, and then simultaneously folding the severed blanks on lines thereof which correspond to lines of the webs which extend transversely of the width of the webs and abutting the beveled opposite sides of the body section.

39. The method of making a box element which comprises independently feeding a pair of webs so that portions thereof will be opposite and in parallel contiguous relation, independently severing said webs transversely of their axes of feed thereby producing a composite blank, and thereafter folding said composite blank on lines thereof which are continuations of the longitudinal lines of said webs into a tubular element.

40. The method of making a box element which comprises independently feeding a pair of webs so that portions thereof will be opposite and in parallel contiguous relation, thereafter folding the end of one web over the end of the other, thereafter independently severing said webs transversely of their axes of feed thereby producing a composite blank, and thereafter folding said composite blank on lines thereof which are continuations of the longitudinal lines of said webs into a tubular element.

In testimony whereof I affix my signature, in the presence of two witnesses.

CARLOS HOLLY.

Witnesses:
HERVE C. HOLLY,
ELLSWORTH STORRS.